J. H. DICKSON.
SULKY.
APPLICATION FILED AUG. 11, 1909.
960,848.
Patented June 7, 1910.
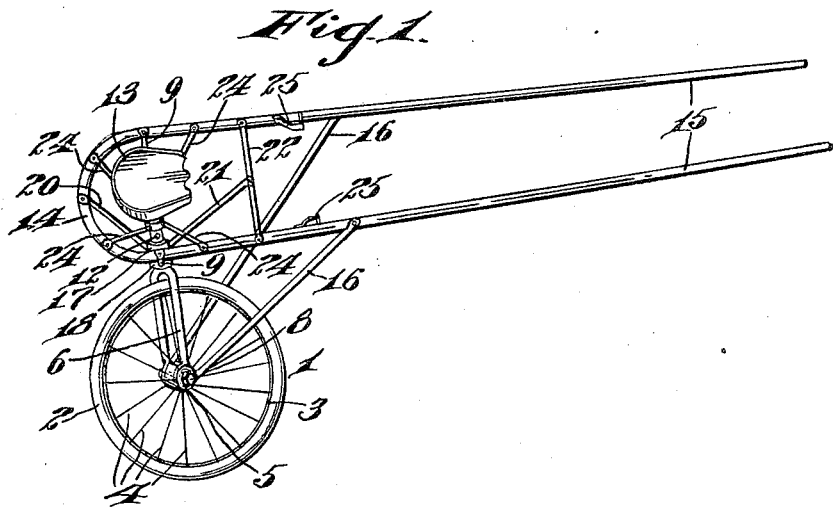
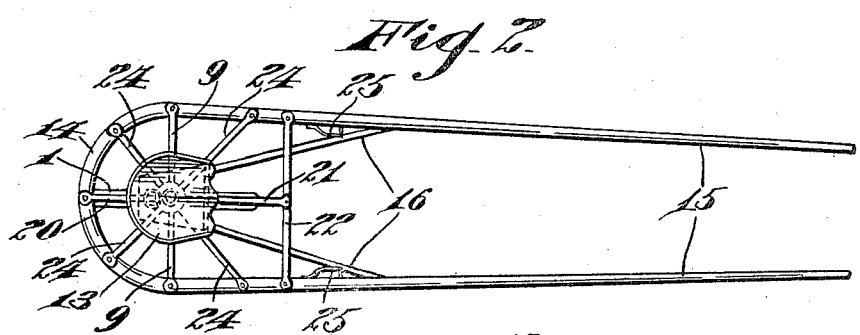
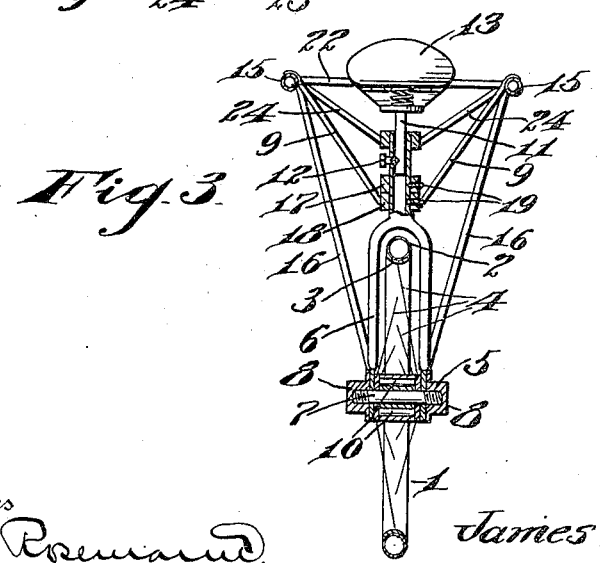
Witnesses
Inventor
James H. Dickson,
By Joshua R. H. Potts.
Attorney

UNITED STATES PATENT OFFICE.

JAMES H. DICKSON, OF PHILADELPHIA, PENNSYLVANIA.

SULKY.

960,848.   Specification of Letters Patent.   Patented June 7, 1910.

Application filed August 11, 1909. Serial No. 512,311.

*To all whom it may concern:*

Be it known that I, JAMES H. DICKSON, a citizen of the United States, residing at Philadelphia, in the county of Philadelphia and State of Pennsylvania, have invented certain new and useful Improvements in Sulkies, of which the following is a specification.

My invention relates to an improved sulky, more particularly designed as a racing sulky for use with harness horses, the object of the invention being to provide an improved one-wheel sulky with an improved arrangement of seat supporting post having braces and stays, whereby a strong and durable device is secured as well as one neat and attractive in appearance and which will reduce to the minimum the weight to be drawn by the animal and the frictional resistance of contact with the ground and reduce to the minimum all parts which afford resistance to the wind to retard the speed of the animal.

With these and other objects in view, the invention consists in certain novel features of construction and combinations and arrangements of parts as will be more fully hereinafter described and pointed out in the claims.

In the accompanying drawings, Figure 1, is a perspective view illustrating my improvements. Fig. 2, is a top plan view, and Fig. 3, is a view in vertical cross section.

1, represents the sulky wheel, which is preferably provided with a pneumatic tire 2, around a rim 3, the latter connected by wire spokes 4 with the hub 5.

6 represents a forked or bifurcated post, having registering openings in its lower end to receive the journal or axle 7 which latter is screw threaded at its ends for the reception of nuts 8 to hold the parts together. Around the journal or axle 7 and between the same and hub 5 roller bearings 10 are located and are preferably of the type shown most clearly in Fig. 3, to secure the minimum of friction and hence insure an easy running device.

The post 6 is preferably of tubular form and a seat post 11 is adjustably secured in the upper end of post 6 by means of a set screw 12 and supports a spring seat 13, located centrally within the curved rear end of connecting member 14 of the shafts 15. Braces 16, project upwardly and forwardly and connect the lower ends of forked post 6 with the shafts 15.

Two collars 17 and 18 respectively are secured on post 6 by screws 19, just above the point where the post is bifurcated. Upwardly and laterally projecting braces 9, connect the lower collar 18 with the shafts 15 and two braces 20 and 21 respectively, are secured to collar 17, brace 20 extending upwardly and rearwardly and secured to the connecting member 14, while brace 21 projects upwardly and forwardly and is secured to a cross bar 22 connecting shafts 15. Diagonal stays 24 also connect the shafts and connecting member with post 6, so it will be seen that while the post supports the weight of the driver it is effectually braced in all directions and an extremely strong sulky is the result. Foot rests 25 are provided on the shafts and may be of various forms.

A great many slight changes might be made in the general form and arrangement of the parts described without departing from my invention and hence I would have it understood that I do not restrict myself to the precise details set forth but consider myself at liberty to make such slight changes and alterations as fairly fall within the spirit and scope of the appended claims.

Having thus described my invention what I claim as new and desire to secure by Letters Patent is:—

1. In a sulky, the combination with a single wheel, of a forked post straddling the wheel, a journal or axle supported in the wheel and secured in said forked post, shafts, a curved member at the rear and connecting said shafts, a seat on the upper end of said post between the shafts and connecting member, and braces connecting said post with the shafts, substantially as set forth.

2. In a sulky, the combination with a single wheel, of a forked post straddling the wheel, a journal or axle supported in the wheel, and said forked end of the post having openings in which are secured the ends of said journal, nuts on the ends of said journal, roller bearings around the journal in the wheel hub, a seat on the upper end of the post, shafts, a curved member at the rear and connecting said shafts, and devices connecting said post with the shafts.

3. In a sulky, the combination with a single wheel, of a forked post straddling and supported by said wheel, a seat on said post, shafts, a curved member at the rear and connecting said shafts, and braces connecting said post and shafts.

4. In a sulky, the combination with a single wheel of a forked post straddling and supported by said wheel, shafts, a curved member connecting said shafts and located in rear of the seat, forwardly projecting braces connecting the lower end of the post with the shafts, collars on the post, braces connecting said collars with the shafts and curved connecting member, and stays connecting said shafts and connecting member with said post, substantially as set forth.

In testimony whereof I have signed my name to this specification in the presence of two subscribing witnesses.

JAMES H. DICKSON.

Witnesses:
A. W. FOSTER,
J. A. L. MULHALL.